United States Patent [19]

Prosser

[11] Patent Number: 4,769,411
[45] Date of Patent: Sep. 6, 1988

[54] PVDC JAW RELEASE LATEX
[75] Inventor: Thomas J. Prosser, Newark, Del.
[73] Assignee: Hercules Incorporated, Wilmington, Del.
[21] Appl. No.: 890,212
[22] Filed: Jul. 28, 1986
[51] Int. Cl.⁴ .................. C08L 33/02; C08L 91/06
[52] U.S. Cl. .................... 524/278; 524/275; 524/487; 525/329.9; 525/330.2
[58] Field of Search .......... 524/278, 487, 275; 526/329.4, 317; 525/330.2, 329.9

[56] References Cited
U.S. PATENT DOCUMENTS 3,387,997  6/1968  Sculley ........................ 524/278
3,397,163  8/1968  Bruno et al. .................. 524/278
4,007,433  6/1978  Kane ........................... 524/278
4,173,669  11/1979 Ashida et al. ................. 525/330.2

FOREIGN PATENT DOCUMENTS 815089   6/1969  Canada ......................... 525/330.2
2672171  11/1969 United Kingdom ................ 524/278

Primary Examiner—Allan M. Lieberman
Attorney, Agent, or Firm—Dale R. Lovercheck

[57] ABSTRACT

Modified heat seal coatings are disclosed which impact improved heat seal jaw release characteristics to polypropylene fibers. These coatings are based on a partially neutralized terpolymer of vinylidene chloride, methyl methacrylate and acrylic acid.

11 Claims, No Drawings

PVDC JAW RELEASE LATEX

This invention relates to improvements in the heat seal characteristics of polyolefin films. In a specific aspect, it relates to modifications of heat sealable coatings to provide improved jaw release qualities following heat sealing and to films carrying such coatings.

BACKGROUND OF THE INVENTION

Polyolefin films and, in particular, polypropylene films, find wide usage in the preparation of bags on so-called vertical form and fill equipment. On this equipment, a flat sheet of film is converted into a bag by first forming it into a tubular shape, sealing the longitudinal seam, creating a transverse seal, filling the thus formed bag, sealing it at the top, then cutting the filled bag from the continuous tube and allowing it to free fall into a shipping container. When this technique is carried out using heat seal closing means, it is necessary that the film release readily from the heat seal apparatus in order to free fall. Most films do not release readily after heat sealing without some impetus to do so. In the case of the form and fill apparatus, this impetus is provided by the weight of the package. Since a weight of 200 to 400 grams may be necessary to release the film from the hot sealing equipment, the use of the form and fill technique has been essentially foreclosed form use with lighter packages.

It is the object of this invention to provide improved heat seal coatings for polyolefin films which, in addition to good heat sealing properties, exhibit excellent jaw release properties. Another object of this invention is to provide polyolefin films which can be readily heat sealed for use in form and fill operations. Yet another object is to provide polyolefin films which can be used for packaging relatively small, lightweight volumes of items via the vertical form and fill technique.

PRIOR ART

Film coating compositions comprised of poly(vinylidene chloride) copolymers and terpolymers are well known in the art and have been used for some time on polyolefin films as oxygen and moisture barriers and as heat seal coatings. A number of patents have addressed various aspects of the problems encountered.

U.S. Pat. No. 3,202,528 teaches applying a copolymer of vinylidene chloride and acrylonitrile to a polypropylene film to impart heat sealability. Application is effected from solution to an electrically treated film surface.

U.S. Pat. No. 3,533,992 teaches a barrier/heat seal coating comprised of a copolymer of vinylidene chloride, and acrylate monomer and optionally a third monomer which can be an alkyl acrylate, vinyl chloride or butadiene.

U.S. Pat. No. 3,353,991 teaches a barrier/heat seal coating based on a copolymer of vinylidene chloride, acrylonitrile, methyl methacrylate and an unsaturated aliphatic acid which can be acrylic, methacrylic or itaconic acid.

U.S. Pat. No. 3,617,368 teaches a latex for coating polyolefin film substrates containing an interpolymer of preferably vinylidene chloride, methyl acrylate or methacrylate and a sulfonic acid or sulfonic acid salt.

U.S. Pat. No. 3,714,106 teaches copolymers of vinylidene chloride with a hydroxyalkyl ester of an alpha, beta-ethylenically unsaturated carboxylic acid. The ester is said to act as an internal wetting agent to enhance adhesion.

U.S. Pat. No. 3,736,303 teaches a copolymer of vinylidene chloride, an ethylenically unsaturated sulfur acid having hexavalent sulfur, and unsaturated carboxylic and a fourth ethylenically unsaturated monomer.

U.S. Pat. No. 3,843,581 teaches preparation of latex barrier/heat seal coating materials based on vinylidene chloride latices which contain a polyoxyethylene sorbitan fatty acid ester to reduce the heat seal temperature required therewith. U.S. Pat. No. 3,843,582 accomplishes the same objective with an adduct of an aliphatic alcohol or acid with ethylene oxide. U.S. Pat. No. 3,843,582 does it with an alkyl phenol adduct of an olefin oxide.

U.S. Pat. No. 3,850,726 teaches a copolymer of vinylidene chloride, useful as a barrier/heat seal coating which comprises a vinylidene chloride, a hydroxy alkyl either of an alpha, beta-ethylenically unsaturated carboxylic acid, an ethylenically unsaturated sulfur acid containing hexavalent sulfur, an ethylenically unsaturated carboxylic acid and a fifth ethylenically unsaturated monomer.

From the above, it can be seen that there has been a great deal of attention given to the use of vinylidene chloride polymers in the barrier/heat seal application. None, however, has offered a solution to the jaw release problem which is encountered in the vertical form and fill application.

BRIEF STATEMENT OF THE INVENTION

An improved barrier/heat seal coating, according to this invention, is based on a novel ionically modified terpolymer comprised of about 80 to 87.5% by weight vinylidene chloride, 7.0 to 14.5% methyl methacrylate, and 4.5 to 6.5% acrylic acid wherein about 10 to 50% of the acrylic acid has been converted to a metal salt or ammonium form.

A specific embodiment of the invention is an aqueous latex composition having a total solids content of about 40 to 48% by weight, said solids being comprised of ionically modified terpolymer present in an amount of about 93 to 97% by weight of said total solids, 3 to 7% by weight of wax and up to about 1% by weight of silica.

DETAILED DESCRIPTION OF THE INVENTION

The invention, in its broadest sense, is the novel ionically modified vinylidene chloride terpolymer. Ionomeric character is imparted by neutralizing about 10 to 50 mole % of the acrylic acid carboxyl groups with a metal or ammonium salt. Any metal salt can be used to provide the modifying cation such as, e.g., sodium, calcium, potassium, magnesium or zinc. Best results are obtained with divalent cations and most preferably calcium. The anion can be acetate, hydroxide or carbonate.

Calcium carbonate has been found to be a most preferred compound for effecting the ionomeric modification. In practice, it can readily be added as a dry powder and upon reaction, yields innocuous carbon dioxide and water as by-products. Calcium acetate is likewise easy to handle, but may be less desirable in some applications as it forms acetic acid as a by-product which sometimes leaves a faint, unpleasant odor in the coated film.

The unmodified terpolymer latex is known and is widely used as a moisture barrier coating material for polyolefin films. Due to its lower-than-polyolefin melting point, the terpolymer is widely used as a heat seal coating material. It is customary to formulate the latex with a hard wax and silica to provide antiblock and slip properties to the film to which the latex is applied. Normally about 3 to 5 phr of wax is added for this purpose. Films coated with the conventional, unmodified terpolymer have, as explained hereinabove, very poor jaw release properties following heat sealing. Manipulation of the level of wax has no noticeable effect on the jaw release properties of the film.

It is found that wax, added to the latices of this invention, effects a dramatic improvement in jaw release properties upon heat sealing in addition to antiblock and slip characteristics. A wax concentration of about 3 to 7% is included in the latex, preferably about 5%. Jaw release is decreased to a value on the order of 25 to 30 grams.

It is also found that the antiblocking characteristic of the films is improved with increasing wax content in the presence of the ionically modified terpolymer. This is likewise contrary to the result when the conventional terpolymer is employed.

The wax that can be used may be naturally occuring material or a paraffinic material derived from petroleum refining. Carnauba wax is a preferred example of wax.

The invention is exemplified in the following examples where parts and percentages are be weight unless otherwise specified.

EXAMPLE 1

A conventional PVDC latex containing 46% of a terpolymer consisting of 85.2% vinylidene chloride units, 9.3% methyl methacrylate and 5.5% acrylic acide was placed in a magnetically stirred vessel equipped with a pH electrode. The pH was adjusted to about 5.0 with ammonium hydroxide and 15% aqueous calcium acetate was added dropwise with vigorous agitation. Following this addition, additional ammonium hydroxide was added to adjust the pH to 5.5. To the calcium-modified PVDC latex was added an aqueous 22% carnauba wax dispersion (Mechem Lube 160 by Michelmen Chemicals, Inc.) and 0.5 part of silica (Syloid 244 by Davison Chemical) per hundred parts of the terpolymer. This mixture was agitated vigorously to assure good dispersion. In a series of runs, the amount of calcium acetate solution and wax dispersion were varied to vary the Ca/CO$_2$H equivalents ratio and the wax concentration relative to the terpolymer as shown in Table 1.

The formulation was applied to one side of a 62 gauge homopolypropylene film which had previously been subjected to corona discharge treatment to enhance its wettability. Coating was carried out at 90 feet/minute using an air knife to control the coating thickness at 6 to 8 ga. The coating was dried at 107° F.

The uncoated side of the film was laminated using a comercial laminating adhesive, to the uncoated side of a commercial polypropylene film which was coated on one side with the same PVDC latex dispersion lacking the calcium modification. The laminated film was placed in a conventional vertical form, fill and seal packaging machine. Four-by-six-inch bags were produced with the unmodified coated surface on the interior. They were loaded at different levels with simulated product weights and heat sealed with 127° C. crimping jaws to determine the minimum load required to cause the bags to release from the hot jaws simultaneously with opening of the jaws.

Results of these determinations and results of a control run wherein the unmodified latex was employed on the same film are presented in Table I.

TABLE I

| Sample No. | Equiv. Ratio, $Ca^{++}/(CO_2H)^-$ (%) | Wax Conc. (phr.) | Silica Conc. (phr.) | 127° C. Jaw Release (gms.) |
|---|---|---|---|---|
| Control | 0 | 3.0 | 0.5 | 360 |
| Control | 0 | 5.0 | 0.5 | 360 |
| Control | 0 | 7.0 | 0.5 | 360 |
| 1-A | 10 | 3.0 | 0.5 | 250 |
| 1-B | 25 | 7.0 | 0.5 | 10 |
| 1-C | 30 | 3.0 | 0.5 | 70 |
| 1-D | 30 | 3.5 | 0.5 | 75 |
| 1-E | 30 | 4.0 | 0.5 | 25 |
| 1-F | 30 | 4.5 | 0.5 | 15 |
| 1-G | 30 | 5.0 | 0.5 | 10 |
| 1-H | 40 | 3.0 | 0.5 | 80 |
| 1-I | 40 | 5.0 | 0.5 | 10 |
| 1-J | 40 | 7.0 | 0.5 | 10 |

From the data in Table I, it is clear that both the wax content and the degree of ionic modification of the terpolymer contribute to improvement of the jaw release property.

EXAMPLE 2

In this example, the effect of changing the monomer concentration in the terpolymer was studied. Calcium acetate was again employed as the source of metal ions and other aspects of the preparation, coating and jaw release testing were as set forth in Example 1.

Pertinent data are recorded in Table II.

TABLE II

| Sample No. | PVDC Monomer Composition (wt. %) | | | Coating Formulation | | | 260° F. Jaw Release (gms.) |
|---|---|---|---|---|---|---|---|
| | VDC | MMA | AA | Equiv. Ratio $Ca^{++}/(CO_2H)^-$ (%) | Wax Conc. (phr.) | Silica Conc. (phr.) | |
| Control | 80.0 | 14.5 | 5.5 | 0 | 3.0 | 0.5 | 300 |
| 2-A | 80.0 | 14.5 | 5.5 | 20 | 5.0 | 0.5 | 0 |
| 2-B | 80.0 | 14.5 | 5.5 | 30 | 5.0 | 0.5 | 0 |
| 2-C | 80.0 | 14.5 | 5.5 | 40 | 5.0 | 0.5 | 10 |
| Control | 82.5 | 12.0 | 5.5 | 0 | 3.0 | 0.5 | 300 |
| 2-D | 82.5 | 12.0 | 5.5 | 20 | 5.0 | 0.5 | 10 |
| 2-E | 82.5 | 12.0 | 5.5 | 30 | 5.0 | 0.5 | 0 |
| 2-F | 82.5 | 12.0 | 5.5 | 40 | 5.0 | 0.5 | 0 |
| 2-G | 85.0 | 9.5 | 5.5 | 20 | 5.0 | 0.5 | 10 |
| 2-H | 85.0 | 9.5 | 5.5 | 30 | 5.0 | 0.5 | 0 |
| 2-I | 85.0 | 9.5 | 5.5 | 40 | 5.0 | 0.5 | 0 |
| 2-J | 87.5 | 7.0 | 5.5 | 20 | 5.0 | 0.5 | 0 |
| 2-K | 87.5 | 7.0 | 5.5 | 30 | 5.0 | 0.5 | 0 |

TABLE II-continued

| Sample No. | PVDC Monomer Composition (wt. %) | | | Coating Formulation | | | 260° F. Jaw Release (gms.) |
|---|---|---|---|---|---|---|---|
| | VDC | MMA | AA | Equiv. Ratio $Ca^{++}/(CO_2H)^-$ (%) | Wax Conc. (phr.) | Silica Conc. (phr.) | |
| 2-L | 87.5 | 7.0 | 5.5 | 40 | 5.0 | 0.5 | 0 |

EXAMPLE 3

In this example, the latex employed in Example 1 was modified with varying amounts of other metal acetates. Modification was effected by adding the appropriate amount of 2N solution of the metal acetate to 800 parts of the latex. Otherwise the procedures were the same as in Example 1.

Pertinent data are recorded in Table III.

TABLE III

| Sample No. | Metal ion | Coating Formulation | | | 127° C. Jaw Release (gms.) |
|---|---|---|---|---|---|
| | | Equiv. Ratio $CO_2H$ (%) | Wax Conc. (phr.) | Silica Conc. (phr.) | |
| 3-A | $NH_4$ | 20 | 5.0 | 0.5 | 90 |
| 3-B | $NH_4$ | 30 | 5.0 | 0.5 | 130 |
| 3-C | $NH_4$ | 40 | 5.0 | 0.5 | 180 |
| 3-D | Na | 20 | 5.0 | 0.5 | 10 |
| 3-E | Na | 30 | 5.0 | 0.5 | 60 |
| 3-F | Na | 40 | 5.0 | 0.5 | 20 |
| 3-G | K | 20 | 5.0 | 0.5 | 170 |
| 3-H | K | 30 | 5.0 | 0.5 | 90 |
| 3-I | K | 40 | 5.0 | 0.5 | 10 |
| 3-J | Mg | 20 | 5.0 | 0.5 | 10 |
| 3-K | Mg | 30 | 5.0 | 0.5 | 10 |
| 3-L | Mg | 40 | 5.0 | 0.5 | 10 |
| 3-M | Zn | 20 | 5.0 | 0.5 | 55 |
| 3-N | Zn | 30 | 5.0 | 0.5 | 25 |
| Control | — | 0 | 3.0 | 0.5 | 500 |
| Control | — | 0 | 5.0 | 0.5 | 400 |

EXAMPLE 4

In this example, the latex employed in Example 1 was modified using calcium hydroxide as the source of the metal ion.

The latex (1600 parts) was charged to a magnetically stirred reaction vessel and the requisite amount of Ca(OH)$_2$ was added as a 15% aqueous slurry. Stirring was continued until a constant pH was established. pH was then adjusted to 5.0 with $NH_4OH$. Coating and testing were carried out as in Example 1.

Pertinent data are recorded in Table IV.

TABLE IV

| Sample No. | Equiv. Ratio $Ca^{++}/(CO_2H)^-$ (%) | Wax Conc. (phr.) | Silica Conc. (phr.) | 127° C. Jaw Release (gms.) |
|---|---|---|---|---|
| Control | 0 | 3.0 | 0.5 | 340 |
| 4-A | 10 | 3.0 | 0.5 | 15 |
| 4-B | 10 | 5.0 | 0.5 | 15 |
| 4-C | 20 | 3.0 | 0.5 | 15 |
| 4-D | 20 | 5.0 | 0.5 | 0 |
| 4-E | 30 | 3.0 | 0.5 | 10 |
| 4-F | 30 | 5.0 | 0.5 | 0 |
| 4-G | 40 | 3.0 | 0.5 | 10 |
| 4-H | 40 | 5.0 | 0.5 | 0 |

EXAMPLE 5

In this example, calcium carbonate was employed as the metal ion source.

The unmodified latex from Example 1 was charged (1600 parts) to a magnetically stirred reaction vessel. The required amount of powdered calcium carbonate was added over a five-minute period and agitation was continued until reacton was complete and a constant pH was established. pH was then adjusted to the desired range by adding concentrated $NH_4OH$. Coating and testing were carried out as in Example 1.

Pertinent data are recorded in Table V.

TABLE V

| Sample No. | Adjusted pH | Coating Formulation | | | 127° C. Jaw Release (gms.) |
|---|---|---|---|---|---|
| | | Equiv. Ratio $Ca^{++}/(CO_2H)^-$ (%) | Wax Conc. (phr.) | Silica Conc. (phr.) | |
| Control | — | 0 | 3.0 | 0.5 | 400 |
| Control | — | 0 | 5.0 | 0.5 | 400 |
| 5-A | 5.0 | 10 | 3.0 | 0.5 | 370 |
| 5-B | 5.0 | 10 | 5.0 | 0.5 | 90 |
| 5-C | 5.5 | 20 | 3.0 | 0.5 | 90 |
| 5-D | 5.5 | 20 | 5.0 | 0.5 | 0 |
| 5-E | 5.5 | 30 | 3.0 | 0.5 | 10 |
| 5-F | 5.5 | 30 | 5.0 | 0.5 | 0 |
| 5-G | 6.1 | 40 | 3.0 | 0.5 | 0 |
| 5-H | 6.1 | 40 | 5.0 | 0.5 | 0 |

EXAMPLE 6

The procedure described in Example 5 was followed using other metal carbonates added as dry powder or aqueous slurries. In each case final pH modification was to about pH 5.

Pertinent data are recorded in Table VI.

TABLE VI

| Sample No. | Modifying Agent | Coating Formulation | | | pHa | 127° C. Jaw Release (gms.) |
|---|---|---|---|---|---|---|
| | | Equiv. Ratio $M^{+n}/(CO_2H)^-$ (%) | Wax Conc. (phr.) | Silica Conc. (phr.) | | |
| 6-A | $Na_2CO_3$ | 10 | 3.0 | 0.5 | 5.5 | 125 |
| 6-B | $Na_2CO_3$ | 10 | 5.0 | 0.5 | 5.0 | 10 |
| 6-C | $Na_2CO_3$ | 20 | 3.0 | 0.5 | 5.5 | 145 |
| 6-D | $Na_2CO_3$ | 20 | 5.0 | 0.5 | 5.0 | 175 |
| 6-E | $Na_2CO_3$ | 30 | 3.0 | 0.5 | 5.5 | 260 |
| 6-F | $Na_2CO_3$ | 30 | 5.0 | 0.5 | 5.0 | 260 |
| 6-G | $K_2CO_3$ | 10 | 3.0 | 0.5 | 5.0 | 440 |
| 6-H | $K_2CO_3$ | 10 | 5.0 | 0.5 | 5.0 | 300 |
| 6-J | $K_2CO_3$ | 20 | 3.0 | 0.5 | 5.0 | 290 |
| 6-K | $K_2CO_3$ | 20 | 5.0 | 0.5 | 4.2 | 330 |
| 6-L | $K_2CO_3$ | 30 | 3.0 | 0.5 | 4.8 | 350 |
| 6-M | $K_2CO_3$ | 30 | 5.0 | 0.5 | 4.8 | 310 |
| Control | — | — | 3.0 | 0.5 | 2.6 | 250 |
| 6-N | $CaCO_3$ | 10 | 3.0 | 0.5 | 5.0 | 440 |
| 6-O | $CaCO_3$ | 10 | 5.0 | 0.5 | 5.0 | 290 |
| 6-P | $CaCO_3$ | 20 | 3.0 | 0.5 | 5.5 | 25 |
| 6-Q | $CaCO_3$ | 20 | 5.0 | 0.5 | 5.5 | 0 |
| 6-R | $CaCO_3$ | 30 | 3.0 | 0.5 | 5.5 | 6 |
| 6-S | $CaCO_3$ | 30 | 5.0 | 0.5 | 5.5 | 0 |
| 6-T | $MgCO_3$ | 10 | 3.0 | 0.5 | 5.5 | 300 |
| 6-U | $MgCO_3$ | 10 | 5.0 | 0.5 | 5.0 | 85 |
| 6-V | $MgCO_3$ | 20 | 3.0 | 0.5 | 5.5 | 35 |
| 6-W | $MgCO_3$ | 20 | 5.0 | 0.5 | 5.5 | 10 |
| 6-X | $MgCO_3$ | 30 | 3.0 | 0.5 | 5.5 | 10 |
| 6-Y | $MgCO_3$ | 30 | 5.0 | 0.5 | 5.5 | 10 |

EXAMPLE 7

In this example, the latex was modified using calcium carbonate as the metal ion source as in Example 5. This modified latex was applied to two base films designated X and Y. Film X is a biaxially oriented three-layer polypropylene film comprised of a white opaque core having a clear polypropylene layer on each surface. Film Y is a variant of that film having $TiO_2$ pigment in one of the surface layers. Neither of these films has a heat seal coating on either surface.

Formulation and application of latex to the films were carried out as in previous examples. Coatings were applied to only one side of each film. Controls for each film had coatings of the unmodified latex applied to one side only. The test described in the following paragraph 5 was used to measure the blocking tendency of these films, i.e., the tendency of adjacent film layers in roll stock to adhere or "block" to one another.

Freshly coated films were placed in contact with the coated side of one sheet contacting either the coated or the uncoated side of another sheet. These were allowed to sit at 55° C. for 3 hours under 1 psi pressure. The strength of the bond thus developed was then measured on a one-inch wide specimen using an Instron Tester. The bond strength (g/in) is reported as the blocking tendency in Table VII below.

TABLE VII

| Sample No. | Base Film | Equiv. Ratio $Ca^{++}/(CO_2H)^-$ (%) | Wax Conc. (phr.) | Silica Conc. (phr.) | 1 psi Blocking (g./in.) Coating/Coating | Coating/Base Film |
|---|---|---|---|---|---|---|
| Control | Y | 0 | 3.0 | 0.5 | 33 | 89 |
| Control | Y | 0 | 5.0 | 0.5 | 13 | 86 |
| 7-A | Y | 10 | 3.0 | 0.5 | 4 | 38 |
| 7-B | Y | 10 | 5.0 | 0.5 | 4 | 8 |
| 7-C | Y | 20 | 3.0 | 0.5 | 3 | 8 |
| 7-D | Y | 20 | 5.0 | 0.5 | 3 | 6 |
| 7-E | Y | 30 | 3.0 | 0.5 | 3 | 4 |
| 7-F | Y | 30 | 5.0 | 0.5 | 3 | 5 |
| Control | X | 0 | 5.0 | 0.5 | 2 | 38 |
| 7-G | X | 10 | 5.0 | 0.5 | 4 | 14 |
| 7-H | X | 20 | 5.0 | 0.5 | 3 | 19 |
| 7-I | X | 30 | 5.0 | 0.5 | 0 | 7 |

The decreased blocking tendency of films coated with the jaw release coatings of this invention is readily apparent.

What is claimed is:

1. A terpolymer comprised of, based on total weight of said terpolymer, about 80 to 87.5% vinylidene chloride, about 7 to 14.5% methyl methacrylate, and about 4.5 to 6.5% acrylic acid wherein about 10 to 50 mole % of the acrylic acid equivalents have been converted to a monovalent or divalent metal or ammonium salt form.

2. The terpolymer of claim 1 wherein said salt is a metal salt.

3. The termpolymer of claim 2 wherein the metal is selected from the class consisting of sodium, potassium, magnesium, zinc and calcium.

4. The terpolymer of claim 3 wherein the metal is calcium.

5. The terpolymer of claim 1 wherein said salt is an ammonium salt.

6. The terpolymer of claim 1 wherein said salt is a divalent metal salt.

7. An aqueous latex composition having a total solids content of about 40 to 48% by weight, said solids content being comprised of about 93 to 97% be weight of the terpolymer of claim 1, about 3 to 7% by weight of was and up to about 1% by weight of silica, said wax being a naturally occurring material or a paraffinic material derived from petroleum.

8. The aqueous latex composition of claim 7 wherein the metal is selected form the class consisting of sodium, potassium, magnesium, zinc and calcium.

9. The aqueous latex composition of claim 8 wherein the metal is calcium.

10. The aqueous latex composition of claim 7 wherein the wax is carnauba wax.

11. An aqueous latex composition having a total solids content of about 40 to 48% by weight, said solids content comprising about 3 to 7% by weight of wax, up to about 1% by weight of silica, about 93 to 97% by weight of a terpolymer, said terpolymer comprising based on total weight of said terpolymer, about 80 to 87.5% vinylidene chloride, about 7 to 14.5% methyl methacrylate, and about 4.5 to 6.5% acrylic acid, wherein about 10 to 50 mole % of the acrylic acid equivalents have been converted to a monovalent or divalent metal or ammonium salt form, said wax being a naturally occurring material or a paraffinic material derived from petroleum refining.

* * * * *

UNITED STATES PATENT AND TRADEMARK OFFICE
CERTIFICATE OF CORRECTION

PATENT NO. : 4,769,411
DATED : September 6, 1988
INVENTOR(S) : Thomas J. Prosser It is certified that error appears in the above-identified patent and that said Letters Patent is hereby corrected as shown below:

Column 1, Line 52

"3,533,992"   should read   --3,353,992--

Column 2, Line 19

"either"   should read   --ether--

Column 3, Line 4

"was"   should read   --wax--

Column 3, Line 10

"was"   should read   --wax--

UNITED STATES PATENT AND TRADEMARK OFFICE
CERTIFICATE OF CORRECTION

PATENT NO. : 4,769,411
DATED : September 6, 1988
INVENTOR(S) : Thomas J. Prosser It is certified that error appears in the above-identified patent and that said Letters Patent is hereby corrected as shown below:

Column 3, Line 24

"be naturally" should read --be a naturally--

Column 3, Line 28

"be" should read --by--

Column 3, Line 34

"acide" should read --acid--

Column 3, Line 42

"Mechem" should read --Michem--

Column 3, Line 43

"Michelmen" should read --Michelman--

UNITED STATES PATENT AND TRADEMARK OFFICE
CERTIFICATE OF CORRECTION

PATENT NO. :     4,769,411

DATED      :     September 6, 1988              Page 3 of 4

INVENTOR(S):     Thomas J. Prosser

It is certified that error appears in the above-identified patent and that said Letters Patent is hereby corrected as shown below:

Column 4, Line 8

"comercial"   should read   --commercial--

Column 8, Line 24

"be"   should read   --by--

Column 8, Line 26

"was"   should read   --wax--

Abstract: Line 1

"impact"   should read   --impart--.

UNITED STATES PATENT AND TRADEMARK OFFICE
CERTIFICATE OF CORRECTION

PATENT NO. : 4,769,411

DATED : September 6, 1988

INVENTOR(S) : Thomas J. Prosser

It is certified that error appears in the above-identified patent and that said Letters Patent is hereby corrected as shown below:

Column 8, Line 13

"termpolymer" should read --terpolymer--.

Signed and Sealed this

Twenty-eighth Day of February, 1989

Attest:

DONALD J. QUIGG

*Attesting Officer*  *Commissioner of Patents and Trademarks*